(12) United States Patent
Yamazaki et al.

(10) Patent No.: US 8,258,661 B2
(45) Date of Patent: Sep. 4, 2012

(54) MOTOR (75) Inventors: Hiroshi Yamazaki, Chiba (JP); Eiji Mayumi, Chiba (JP)

(73) Assignee: Mabuchi Motor Co. Ltd., Chiba (JP)

( * ) Notice: Subject to any disclaimer, the term of this patent is extended or adjusted under 35 U.S.C. 154(b) by 163 days.

(21) Appl. No.: 12/778,924

(22) Filed: May 12, 2010

(65) Prior Publication Data

US 2010/0320854 A1 Dec. 23, 2010

(30) Foreign Application Priority Data

Jun. 22, 2009 (JP) .................. 2009-147736

(51) Int. Cl.
H02K 11/00 (2006.01)
H02K 23/00 (2006.01)
(52) U.S. Cl. ........................... 310/72; 310/89
(58) Field of Classification Search .............. 310/72
See application file for complete search history.

(56) References Cited

U.S. PATENT DOCUMENTS

| | | | |
|---|---|---|---|
| 6,020,668 A * | 2/2000 | Rubinchik | 310/239 |
| 6,555,943 B2 * | 4/2003 | Walther et al. | 310/239 |
| 6,724,122 B2 * | 4/2004 | Frey et al. | 310/238 |
| 6,768,243 B1 * | 7/2004 | Yamazaki et al. | 310/239 |
| 7,427,817 B2 * | 9/2008 | Uenishi et al. | 310/154.22 |
| 7,528,515 B2 * | 5/2009 | Kuroda | 310/154.21 |
| 2011/0006636 A1 * | 1/2011 | Shin et al. | 310/247 |

FOREIGN PATENT DOCUMENTS

| | | |
|---|---|---|
| CN | 1870398 A | 11/2006 |
| DE | 10 2006 044 304 A1 * | 3/2008 |
| EP | 1619774 * | 1/2008 |
| JP | 11-044270 | 2/1999 |
| JP | 2000-184661 | 6/2000 |

OTHER PUBLICATIONS

First Office Action, mailed Jul. 3, 2012 from Chinese Application No. 201010179456.2, 12 pages.

* cited by examiner

*Primary Examiner* — Burton Mullins
(74) *Attorney, Agent, or Firm* — Schwabe, Williamson & Wyatt, P.C.

(57) ABSTRACT

A motor includes a tubular housing having flat side walls along each side of rectangular joined with each other by joining sections, a magnet, having magnet poles in the jointing section, disposed along the inner peripheral surfaces of the housing, a shaft inserted along the axis of the housing, an armature fixed to the shaft in such a position as to be opposite to the magnet, a commutator mounted on the shaft, a carbon brush in sliding contact with the outer peripheral surface of the commutator, and electrical components provided within the housing. The electrical components in the longer direction are arranged such that they are not parallel with all the sides of the housing.

7 Claims, 12 Drawing Sheets

MOTOR

CROSS-REFERENCE TO RELATED APPLICATIONS

This application is based upon and claims the benefit of priority from the prior Japanese Patent Application No. 2009-147736, filed on Jun. 22, 2009, the entire content of which is incorporated herein by reference.

BACKGROUND OF THE INVENTION

1. Field of the Invention

The present invention relates to a motor and more particularly to a motor having brushes for power feeding within a housing.

2. Description of the Related Art

A DC motor (hereinafter referred to simply as "motor" also) is used in all fields and applications ranging from electrical equipment for automobiles and the like, audio and video equipment to household electrical appliances, toys and models.

For the motors in such applications, it is desired that electrical noise occurring during their operation be reduced. There are some known arts to reduce such noise by connecting electrical elements, such as capacitors or choke coils, to the circuit constituting the motor. For example, Reference (1) in the following Related Art List discloses a motor having a plurality of choke coils arranged in parallel with the direction of the rotational axis of the motor. Also, Reference (2) discloses a motor having a pair of choke coils aligned with each other.

2. Related Art List (1) Japanese Patent Application Publication No. 2000-184661.

(2) Japanese Patent Application Publication No. Hei11-44270.

However, the arrangement of choke coils in the motor as described above may inevitably lead to larger sizes of the motor in the axial and radial directions. Moreover, shortening the length of the choke coil in order to downsize it may result in a loss of the effect for reducing electrical noise.

SUMMARY OF THE INVENTION

The present invention has been made in view of the foregoing circumstances, and a purpose thereof is to provide a technology for downsizing the motor without a loss of reliability.

To resolve the foregoing problems, a motor according to one embodiment of the present invention comprises: a tubular housing having four flat side walls along each side of rectangular, the side walls joined with each other by joining sections; a magnet disposed along inner peripheral surfaces of the housing, the magnet having magnetic poles in the joining sections; a shaft inserted along an axis of the housing; an armature fixed to the shaft in such a position as to be opposite to the magnet; a commutator mounted on the shaft; a brush in sliding contact with an outer peripheral surface of the commutator; and an electrical component provided within the housing. The electrical component in a longer direction thereof is arranged such that it is not parallel with all side walls of the housing.

The "tubular" meant here indicates that the shape of the housing may be a polygon having a plurality of side walls along each side. And the joining sections that connect the side walls may be chamfered or curved (rounded). From the point of view of downsizing the motor, it is desirable that the plurality of side walls form a regular polygon. The length of the electrical component is preferably greater than the length from the outer periphery of the commutator to the side wall.

By employing this embodiment, the housing is so shaped that the cross section thereof is larger than that in the case where the shape of the housing is cylindrical. That is, according to this embodiment, the area of the joining sections is larger than that in the case where the shape thereof is cylindrical. Accordingly, it is easy to place the electrical components in such a manner that the electrical components in a longer direction thereof can be arranged such that they are not parallel with all sides of the housing. As a result, the degree of freedom in the layout of the electrical components increases.

The electrical components in the longer direction thereof may be arranged such that the electrical components intersect with two adjacent side walls with a joining section positioned therebetween. Thus, the area of the joining sections is used effectively, which in turn increases the degree of freedom in the kind or the number of electronic components mounted. As a result, the motor is downsized and also highly reliable.

Also, according to this embodiment, a column-shaped carbon brush is biased in the longer direction and slides along the commutator. In other words, the carbon brush is used as a power feeding brush to the armature, so that the motor can be used for high current and high output as compared with a case where a metal brush is used in the motor.

The electrical components may be arranged such that a pair thereof are in a plane perpendicular to the axis of the housing and the electrical components are arranged around the shaft such that the electrical components in the longer direction thereof intersect with each other.

The electrical component may be a choke coil. Where the electrical component is a choke coil, the choke coil is arranged such that the two adjacent side walls with a joining section positioned therebetween and the axial direction of the choke coils intersect with each other. Thus, the sufficient coil length is assured. As a result, the motor is downsized and is highly reliable with the minimized occurrence of electrical noise. Also, a pair of choke coils is arranged nonparellely with each other and therefore the effect for suppressing the electrical noise is enhanced.

The brush may be a carbon brush. The carbon brush may be placed on a diagonal connecting the joining sections. In an attempt to downsize by providing the magnetic poles in the joining sections of a regular-polygonal housing, the carbon brushes are placed on the diagonals where the distance from the commutator can be the longest. As a result, the carbon brushes may be used for a longer period of time, and the life of the motor can be lengthened also.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Hereinbelow, the embodiments will now be described with reference to drawings. Note that in all of the Figures the same structural components and members are given the same reference numerals and the repeated description thereof is omitted as appropriate. Moreover, the embodiments given are for illustrative purposes only and does not limit the scope of the present invention.

Figure 1:
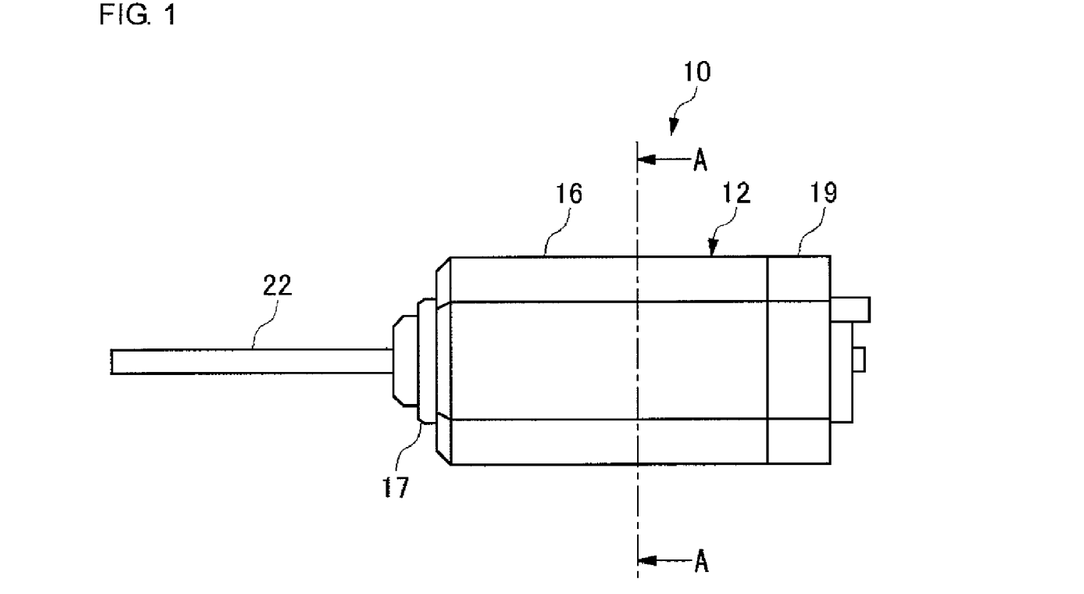
FIG. 1 is a side view of a DC motor according to an embodiment of the present invention.
Figure 2:
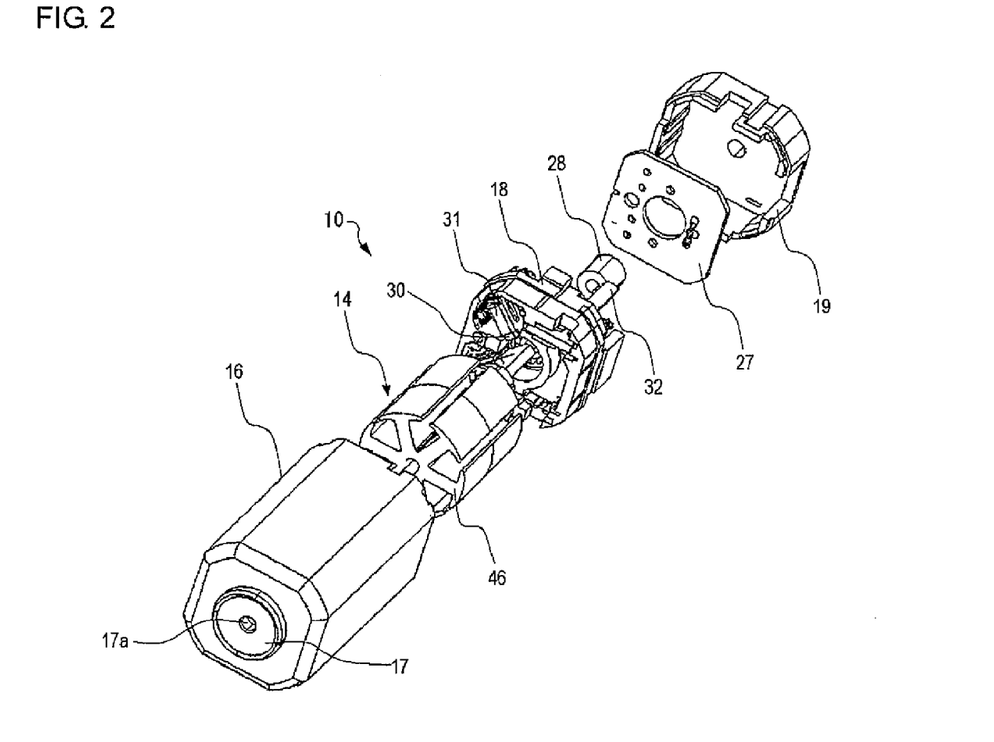
FIG. 2 is an exploded perspective view of a DC motor according to an embodiment as seen from a metal case side.
Figure 3:
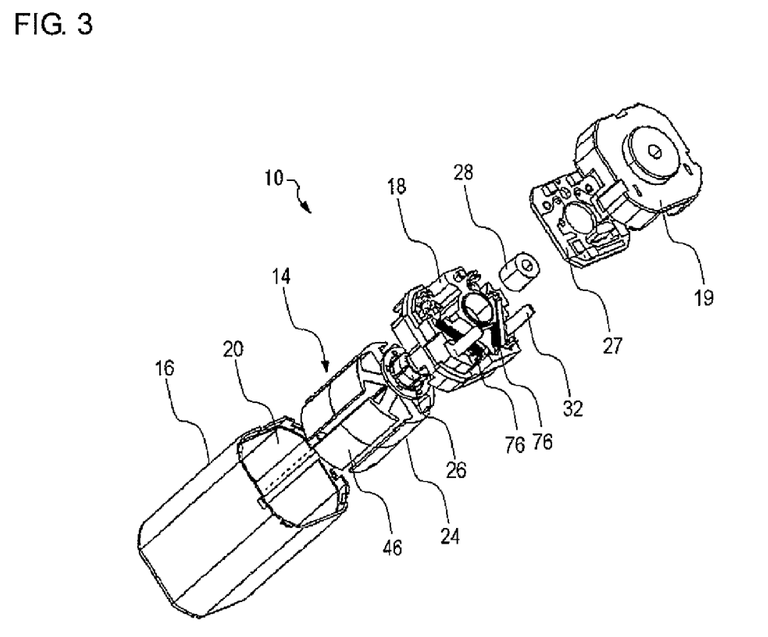
FIG. 3 is an exploded perspective view of a DC motor according to an embodiment as seen from a brush holder side.

FIG. 1 is a side view of a DC motor according to an embodiment of the present invention. FIG. 2 is an exploded perspective view of a DC motor according to the embodiment as seen from a metal case side. FIG. 3 is an exploded perspective view of a DC motor according to the embodiment as seen from a brush holder side.

As illustrated in FIG. 1 to FIG. 3, a DC motor (hereinafter referred to as "motor") 10 according to the present embodiment is so configured that a rotor 14 is housed in a tubular housing 12. The housing 12 is an assembly of a bottomed tubular metal case 16 and a securing holder 19 that secures a tubular resin brush holder 18 to the metal case 16. The metal case 16 also functions as a yoke forming a magnetic circuit. The metal case 16 has a tubular field magnet (hereinafter referred to as "magnet") 20 fixed to the inner peripheral surface thereof and, together with it, forms a stator. In the center of the bottom of the metal case 16 is a boss 17 having a through-hole 17a through which a shaft 22 penetrates. The boss 17, formed in such a manner as to slightly protrude outward, houses a bearing to be discussed later.

The rotor 14, which is disposed on an end half of the rotary shaft 22, is comprised of an armature 24, a commutator 26, a detecting magnet 28, and the like. Disposed in the brush holder 18 is a pair of carbon brushes 30 placed opposite to the commutator 26. The brush holder 18 is provided with a connecting terminal 32 for electrical connection to a circuit board 27. The circuit board 27 has electronic components, such as inter-terminal capacitors and grounding capacitors, mounted thereon. The brush holder 18, connected to the circuit board 27 by the connecting terminal 32, is inserted and fitted to the metal case 16. After the brush holder 18 is fitted into an opening section of the metal case 16 as described above, an opening side of the metal case 16 is sealed by the securing holder 19.

An internal space of the housing 12 is thus defined by the metal case 16 and the brush holder 18. The armature 24 includes a core 46 press-fitted on the shaft 22 and windings 48 wound around the core 46 (see FIG. 4). The core 46 is placed opposite to the magnet 20 with a predetermined clearance (magnetic gap) between the outer periphery thereof and the inner periphery of the magnet 20. The details of the magnetic pole configuration by the magnet 20 and the core 46 will be discussed later.

The commutator 26, which is cylindrical in shape, is press-fitted on the shaft 22 in such a position that it is placed opposite to the carbon brushes 30 with the connecting terminal 32 fitted into the metal case 16. The brush holder 18 has tubular carbon holders 31 fixed thereto, and the carbon brushes 30 are inserted into and held by the carbon holders 31.

The detecting magnet 28, which is a cylinder in shape a little smaller in outside diameter than the commutator 26, is inserted into the shaft 22 in such a manner as to abut on the commutator 26 in the direction of axis line. The circuit board 27 has a Hall element (not shown) mounted thereon, and the Hall element, when the circuit board 27 is fitted into the metal case 16, is placed opposite to the detecting magnet 28.

The detecting magnet 28 is magnetized in two poles such that as it rotates, the north pole and the south pole appear alternately on the outer periphery thereof. The Hall element detects the switching (boundary) of the magnetic poles along with the rotation of the detecting magnet 28 and outputs a pulse signal therefor. The rotational speed (number of revolutions) of the motor 10 can be detected by counting the number of pulse signals in a predetermined period of time.

Figure 4:
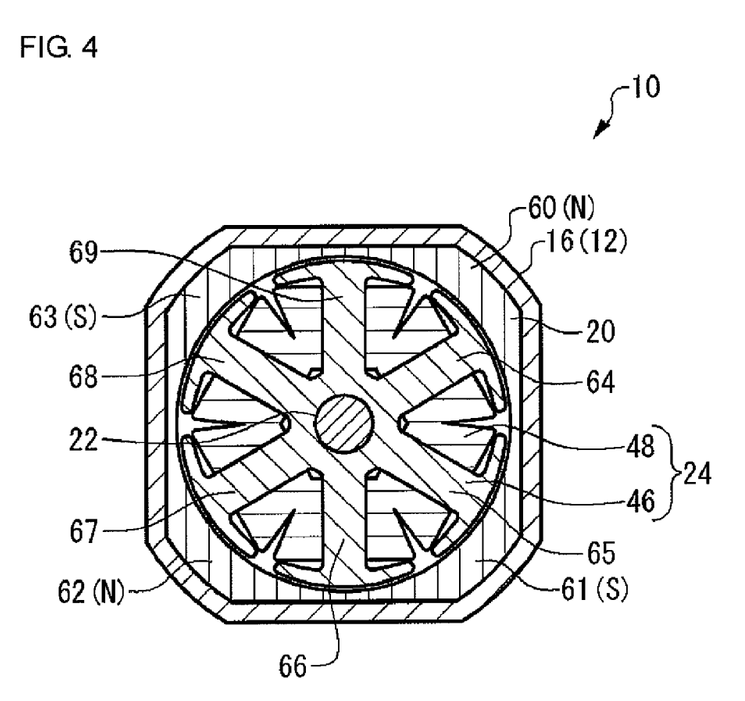
FIG. 4 is a cross-sectional view taken along arrows A-A in FIG. 1.

FIG. 4 is a cross-sectional view taken along arrows A-A in FIG. 1. The metal case 16, with a square-shaped cross section, has four flat side walls, and the adjacent side walls are joined with each other by a curved (rounded) corner section (joining section). In this manner, the motor 10 as a whole is downsized with the corner sections of the square rounded. The magnet 20 has the outer peripheral surface thereof bonded to the inner peripheral surface of the metal case 16 with an adhesive and is of such 1Q shape that it is thicker in positions corresponding to the corner sections of the metal case 16 and thinner in positions corresponding to the side walls thereof. The magnet 20 is so configured that the center of the hypothetical circle formed by the inner peripheral surface thereof coincides with the shaft center of the armature 24, and it has magnetic poles formed substantially in the thicker sections thereof.

That is, the magnet 20 is a 4-pole field magnet of a tubular body having a wall of uneven thickness, with a magnetic pole 60 (north pole), a magnetic pole 61 (south pole), a magnetic pole 62 (north pole), and a magnetic pole 63 (south pole) provided at circumferentially equal intervals. And the center of each magnetic pole in the thicker wall sections is located in each of the four corner sections of the metal case 16. The magnet 20 may be formed, for instance, by integrally molding a magnetic material into a tubular body having a wall of uneven thickness, fixing it inside the metal case 16, and then magnetizing it from outside the metal case 16 using a magnetic field generator. The magnetizing technology is publicly known and therefore the detailed description thereof is omitted here.

On the other hand, the core 46 has six magnetic poles 64 to 69 which extend radially from the central cylinder portion press-fitted on the shaft 22, and the magnetic poles 64 to 69 each have a winding 48 wound therearound. It is to be noted that there is an application of a coating powder for insulation between the core 46 and the winding 48.

(Brush Holder)

Figure 5:
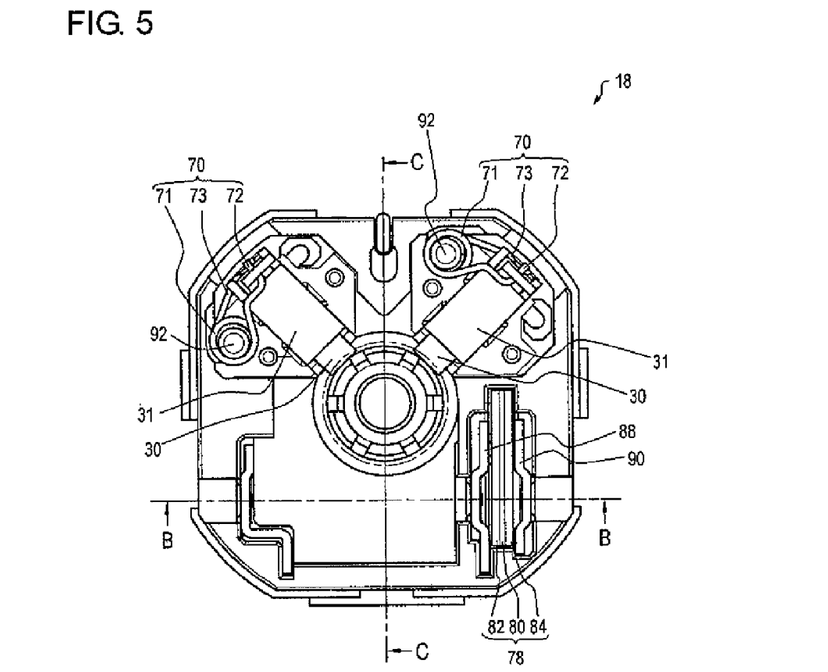
FIG. 5 is an elevational view of a brush holder according to an embodiment.
Figure 6:
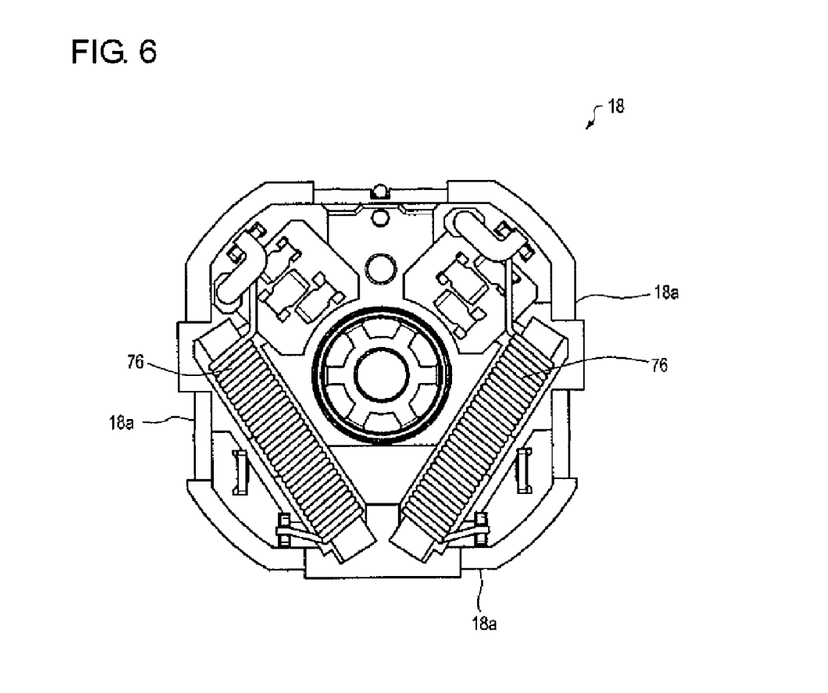
FIG. 6 is an elevational view of a brush holder according to an embodiment as seen from a securing holder side.
Figure 7:
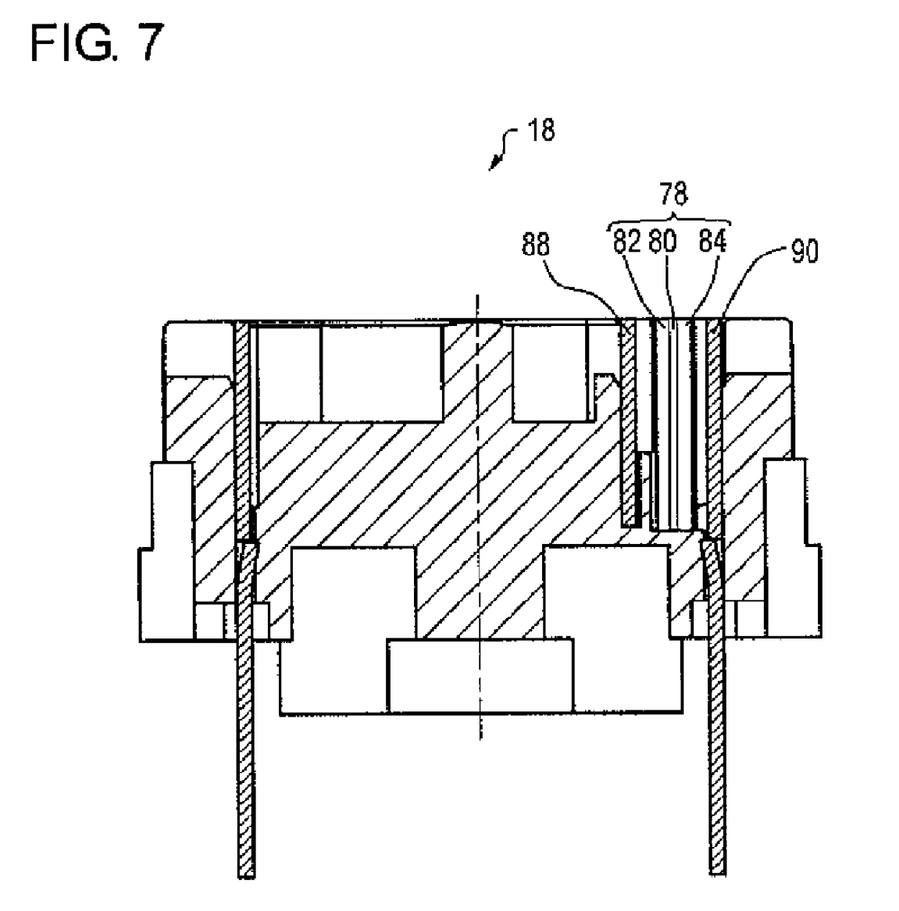
FIG. 7 is a cross-sectional view taken along line B-B in FIG. 5.
Figure 8:
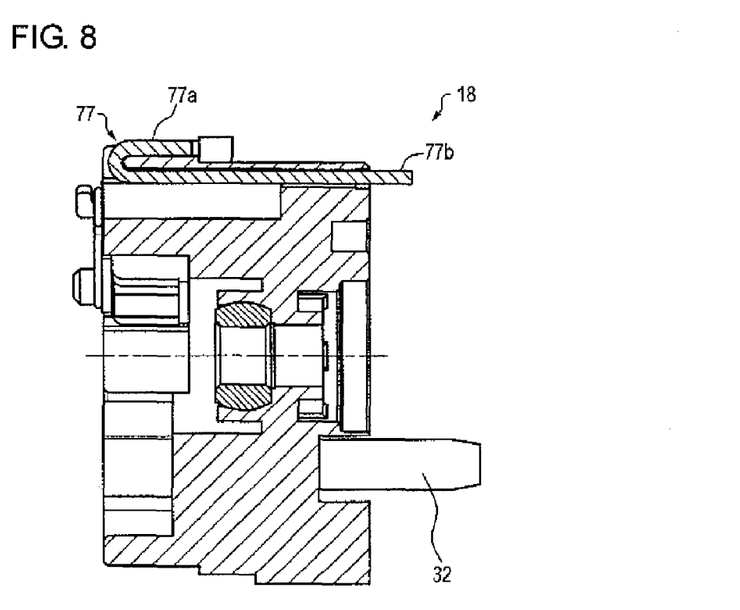
FIG. 8 is a cross-sectional view taken along line C-C in FIG. 5.

Now a brush holder incorporating a PTC (Positive Temperature Coefficient) device will be described in detail. FIG. 5 is an elevational view of a brush holder according to the present embodiment. FIG. 6 is an elevational view of a brush holder according to the present embodiment as seen from a securing holder side. FIG. 7 is a cross-sectional view taken along line B-B in FIG. 5. FIG. 8 is a cross-sectional view taken along line C-C in FIG. 5.

As illustrated in FIG. 5 to FIG. 8, the brush holder 18 has a tubular shape with a bottom, and the corner sections of the square cross section are rounded the same way as with the metal case 16. Provided in the center of the brush holder 18 is a circular hole into which the commutator 26 and the detecting magnet 28 can be inserted in the direction of axis line. Around the hole, various functional parts are optimally arranged, thus making an effective use of the space. Note that the direction of axis line of the brush holder 18 is equal to the direction of the axis of rotation of the shaft 22 which is inserted in the brush holder 18.

Fixed in the top left and right corner sections of the brush holder 18 as shown in FIG. 5 is a pair of tubular carbon holders 31 disposed at 90 degrees apart along the circumferential direction. And slidably held in the carbon holders 31 are carbon brushes 30. The carbon holders 31, each having a long tube-like body of a square cross section and made of an electrically conductive metal, are so arranged as to extend in the radial direction from the axis center of the brush holder 18. It should be appreciated that use of the carbon brushes 30 as the brushes for power feeding to the armature 24 allows the DC motor 10 to be used in higher current and higher output applications than with metal brushes.

The carbon brush 30, which is a long prismatic column with a rectangular cross section, is inserted and slidably held in the carbon holder 31. Thus, when the metal case 16, the rotor 14, the brush holder 18, the circuit board 27 and the securing holder 19 are fitted together, the carbon brushes 30 are so arranged as to extend on the lines connecting the axis center of the commutator 26 to the respective corner sections of the brush holder 18. In the present embodiment, the lines connecting the axis center to the corner sections are also on the diagonals of a square formed by connecting the flat parts of the brush holder 18, and therefore they are the positions where the space in the radial direction is the longest of the circumferential positions within the brush holder 18. This means that the carbon brushes 30 are placed in positions where they can be the longest. Accordingly, in an attempt to downsize by providing magnetic poles in the corner sections of a regular-polygonal housing, the carbon brushes are placed on the diagonals where the distance from the commutator can be the longest. As a result, the carbon brushes may be used for a longer period of time, and the life of the motor may be lengthened also.

A torsion spring 70 is disposed in the space between a corner section and a side wall of the brush holder 18. The torsion spring 70, which is comprised of a coil portion 71, a first end 73 and a second end 72, is so configured that the coil portion 71 thereof is inserted and held in a boss portion 92 located close to a side wall of the brush holder 18 and the first end 73 extending from the coil portion 71 is in contact with the rear end face of the carbon brush 30. The second end 72 extending from the coil portion 71 is fixed to the upper portion of the carbon holder 31. The torsion spring 70 applies a biasing force to a commutator 26 side with the first end 73 thereof communicating the biasing force accumulated in the coil portion 71 to the carbon brush 30.

A not-shown slit in a stroke direction of the carbon brush 30 is provided in the surface of the carbon holder 31 opposite to the torsion spring 70. Therefore, even when the carbon brush 30 moves in a stroke toward the commutator 26, the first end 73 of the torsion spring 70 gets displaced along the slit, thereby applying a biasing force to the carbon brush 30 constantly. This means that the carbon brush 30 can maintain stable contact with the commutator 26 even when it is worn short over years of use. On the other hand, if the coil portion 71 of the torsion spring 70 is placed away from the extended line of the stroke of the carbon brush 30, it will be possible to choose the longest possible carbon brush 30 in advance. Then the life of the carbon brush 30 itself and further the life of the motor 10 will be lengthened.

A PTC device 78 is disposed on the end face of the brush holder 18 on a metal case side, that is, on the side opposite to the armature 24, near each of the bottom left and right corner sections where the carbon holders 31 are not disposed. Thus, the DC motor 10 as a whole can be downsized by making effective use of the corner sections of the brush holder 18 where the carbon brushes 30 are not provided.

On the other hand, as shown in FIG. 6, two choke coils 76 are disposed on the end face of the brush holder 18 on a securing holder 19 side. The choke coils 76, which are the elements for erasing electrical noise, are disposed in the bottom left and right corner sections respectively as shown. The two choke coils 76, in the longer direction, are each so arranged as to intersect with the two adjacent flat side walls 18a of the brush holder 18. Also, the two choke coils 76, in the longer direction, are so arranged as to intersect with each other. Note that, as shown in FIG. 8, the brush holder 18 according to the present embodiment is provided with a grounding wire 77 having a contact portion 77a, which comes into contact with the inner side of the metal case 16 when it is fitted into the metal case 16, and an end portion 77b, which is soldered to the circuit board 27.

Figure 9:
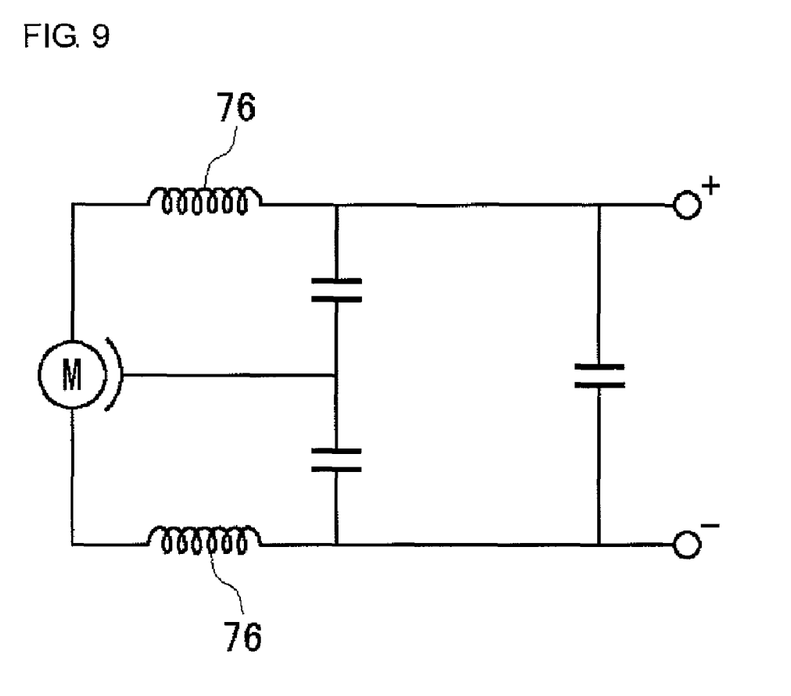
FIG. 9 is a circuit diagram of a DC motor according to an embodiment.

FIG. 9 is a circuit diagram of the DC motor according to the present embodiment. By employing such a circuit configuration as this, if two choke coils 76 are mounted on the motor, the effect for suppressing the electrical noise will be enhanced as compared with a case where they are placed in parallel with each other. Also, the choke coil 76 is placed in a position on a side opposite to the end face where the carbon holder 31 is provided. This arrangement allows the choke coil 76 to be placed in a position where it can be the longest. That is, this arrangement allows the carbon brush 30 to be placed in a position where it can be the longest. Also, the choke coil 76 is provided in a plane perpendicular to the axis line of the housing 12. This arrangement saves the space occupied by the brush holder 18 in the axial direction and consequently the overall length of the motor 10 is downsized.

(Positive Temperature Coefficient (PTC) Thermistor)

A detailed description is now given of the PTC device 78 according to the present embodiment. The PTC device 78 according to the present embodiment is a thermistor having a positive temperature coefficient. In the present embodiment, a resistor element formed of a polymer-based material is exemplified but it may be formed of a ceramic-based material instead, for instance. As the polymer-based PTC device, known is one in which conductive particles such as carbon black and nickel are dispersed into a polymer having a low melting point. Its mechanism is as follows. That is, as the polymer melts, the contacts among the conductive particles are severed and thereby the electric resistance increases. As a result, the current is less likely to flow and, therefore, overcurrent and overheating are suppressed. More specifically, excellent characteristics are achieved when the conductive particles such as carbon black are uniformly dispersed into a crystalline polymer such as polyethylene. On the other hand, a ceramic, in which additives are added to barium titanate, or the like is known as a ceramic-based PTC device. In such PTC devices, the overcurrent and overheating are suppressed using the properties that the electric resistance rises sharply at near the Curie temperature of barium titanate.

Figure 10:
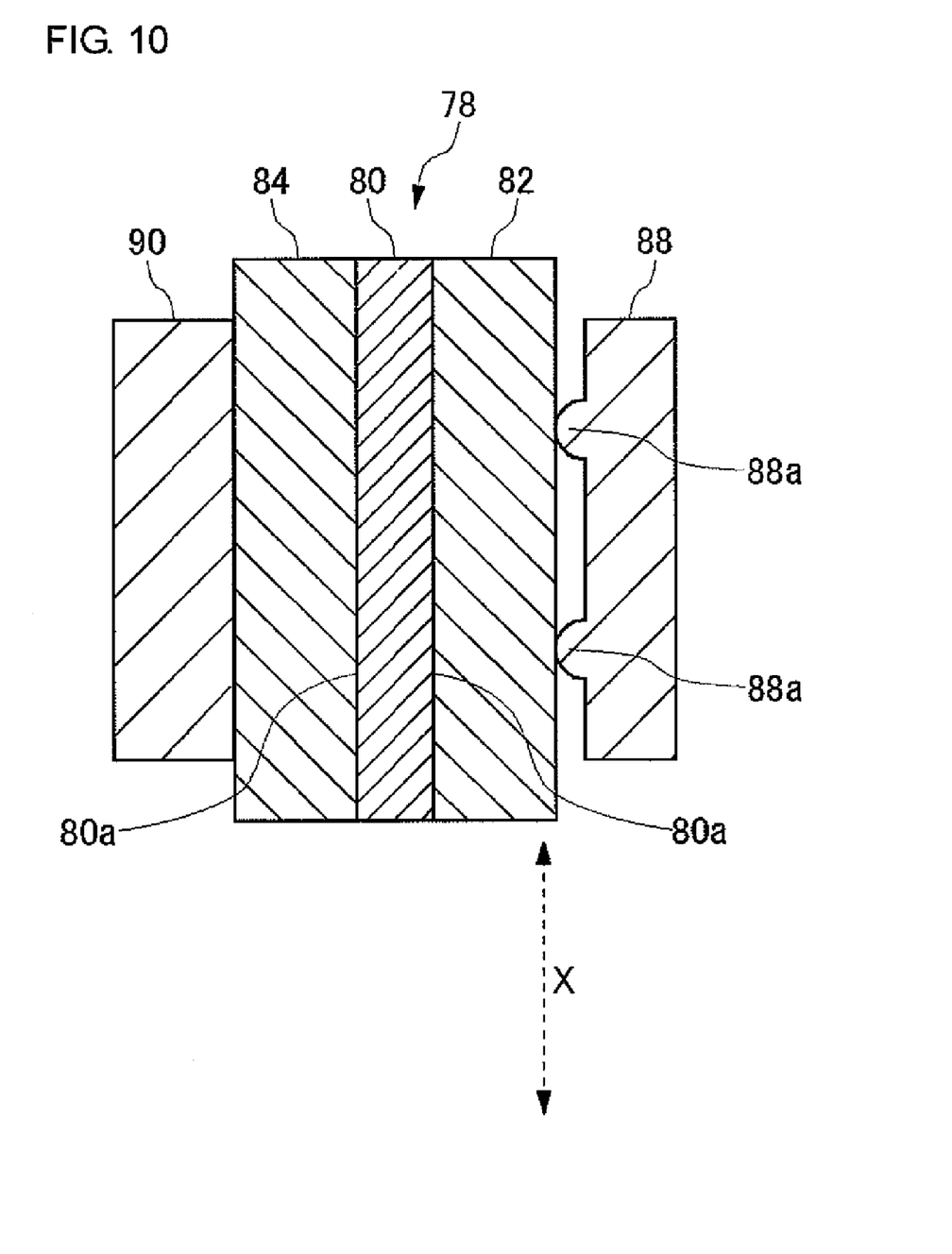
FIG. 10 is a cross-sectional view schematically showing a state where a PTC device according to an embodiment is held between electrode terminals.

FIG. 10 is a cross-sectional view schematically showing a state where a PTC device according to the present embodiment is held between electrode terminals. The PTC device 78 is comprised of a resistor element 80 having a positive temperature coefficient, a first electrode 82 disposed on one face of the resistor element 80, and a second electrode 84 disposed on the other face of the resistor element 80. The PTC device 78 detects the overcurrent in a live circuit or a sharp rise in surrounding temperature, and interrupts the circuit if it is detected.

The brush holder 18 is provided with a pair of electrode terminals 88 and 90 between which the PTC device 78 is held. The electrode terminal 88 has a protrusion 88a that partially presses the first electrode 82. Since the first electrode 82 is thicker than the resistor element 80, the first electrode 82 has a certain degree of strength and therefore the deformation is less likely to occur in the first electrode 82 even though it is partially pressed by the protrusion 88a of the electrode terminal 88. This structure provides a space between the first electrode 82 and the electrode terminal 88, thus improving the heat radiation properties.

Also, the PIC device 78 are sandwiched between the electrode terminals 88 and 90 with each stacking surface 80a between the resistor element 80 and each electrode being parallel to an axis line X of the housing 12. If the stacking surfaces 80a of the PTC device 78 are to be placed perpendicular to the axis line X of the housing 12, they must be so placed as not to interfere with the shaft 22 of the DC motor 10. In such a case, the size of the housing in the radial direction will be inevitably made larger in order to increase the area of the stacking surface 80a of the resistor element 80 to lower the resistance of PTC device 78. In contrast thereto, the stacking surface 80a is so arranged as to be in parallel with the axis line of the housing 12, as described above, so that the stacking surface can be made wider without increasing the diameter of the housing 12 and also without interfering with the shaft 22 of the DC motor 10.

As described above, the DC motor 10 according to the present embodiment includes the tubular housing 12, having a plurality of flat side walls, whose cross section is polygonal, the magnets 12, disposed along the inner peripheral surfaces of the housing 12, each having magnetic poles in the corner sections, the shaft 22 inserted along the axis line of the housing 12, the armature 24 fixed to the shaft 22 and arranged in such a position as to be opposite to the magnet 20, the commutator 26 mounted on the shaft 22 coaxially with the armature 24, the carbon brushes 30, each having a column-shaped main body, the main body in a longer direction being provided along the radial direction of the commutator 26 in the housing, the tip surface thereof being in sliding contact with the outer peripheral surface of the commutator 26, the carbon holder 31, provided within the housing, which supports the carbon brush 30 in such a manner that the carbon brush 30 can move in a stroke toward the radial direction of the commutator 26, the torsion spring 70, provided within the housing, which biases the carbon brush 30 to a commutator side, the PTC device 78, provided within the housing, which electrically conducts to the armature 24 and controls the current flowing through the armature 24, and the electrode terminals 88 and 90 that hold the PTC device 78 therebetween.

Since the circuit board 27 is provided on a securing holder 19 side of the brush holder 18 shown in FIG. 6, a pair of choke coils 76 is so mounted on the brush holder 18 as to cover from the securing holder 19 side (See FIG. 2 and FIG. 3). Various circuit elements such as a capacitor for removing the electrical noise, a diode for use in circuit protection and a Hall element are mounted on the circuit board 27. Also, the choke coils 76 are provided in the positions opposite to the armature 24 with the brush holder 18 positioned therebetween. Thus, even if the choke coil 76, which should be normally fixed tightly, gets somehow loose, the choke coil 7 will not come in contact with the armature 24.

As described above, by employing the motor 10 according to the present embodiment, the layout of the electrical components such as the choke coils is made ingeniously, so that the motor 10 can be downsized and the reliability of the motor can be improved. By way of the following six exemplary embodiments, a description will be given of other layouts using the choke coil as an example with reference to FIG. 11 to FIG. 18. Note that in the following description of the six exemplary embodiments, each constituting member is simplified in each Figure.

(First Exemplary Embodiment)

Figure 11:
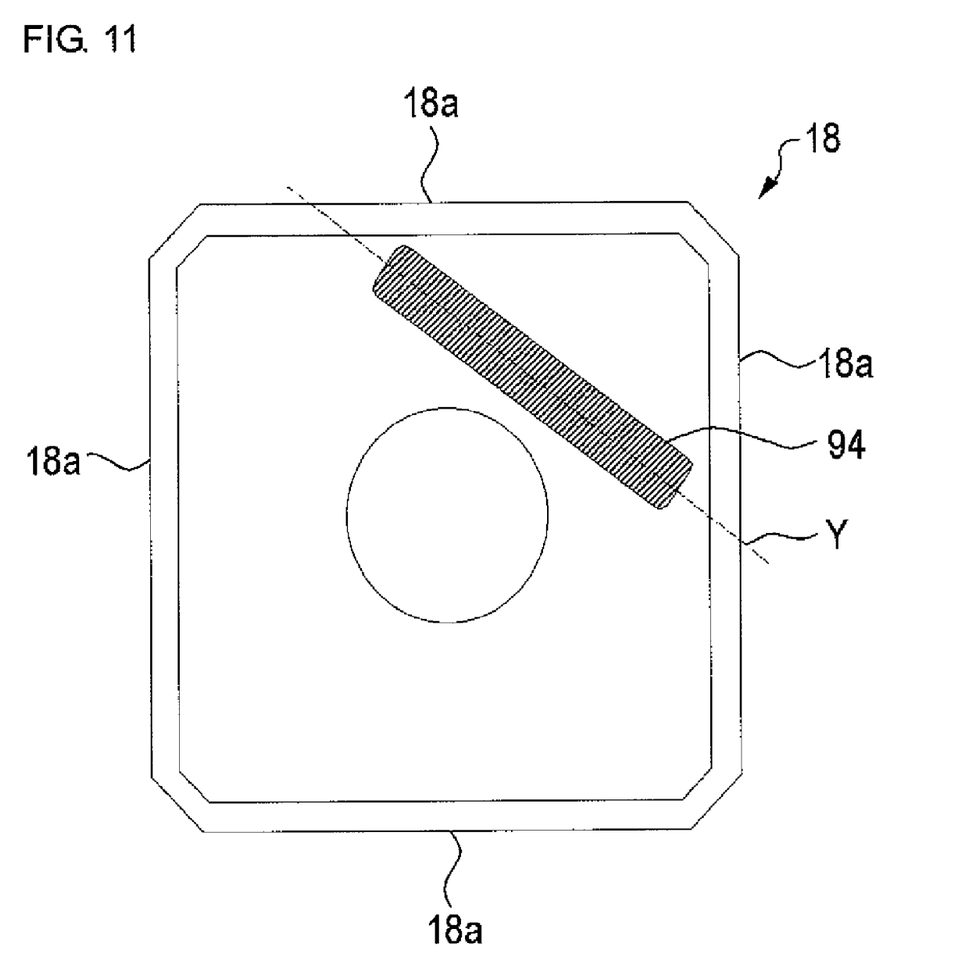
FIG. 11 is a schematic illustration showing a positional relationship between a brush holder and a choke coil of a motor according to a first exemplary embodiment.

FIG. 11 is a schematic illustration showing a positional relationship between a brush holder and a choke coil of a motor according to a first exemplary embodiment. The first exemplary embodiment differs from the embodiment shown in FIG. 6. That is, though a pair of choke coils 76 is used in the embodiment shown in FIG. 6, a single choke coil 94 is used in this first exemplary embodiment. The choke coil 94, in its longer direction Y, is arranged nonparellely with all the side walls 18a. Also, the choke coil 94, in the longer direction Y, is so arranged as to intersect with two adjacent side walls 18a with a corner section positioned therebetween. Such an arrangement enables a larger choke coil to be mounted on one face of the brush holder 18 vertical to the axis line of the housing.

(Second Exemplary Embodiment)

Figure 12:
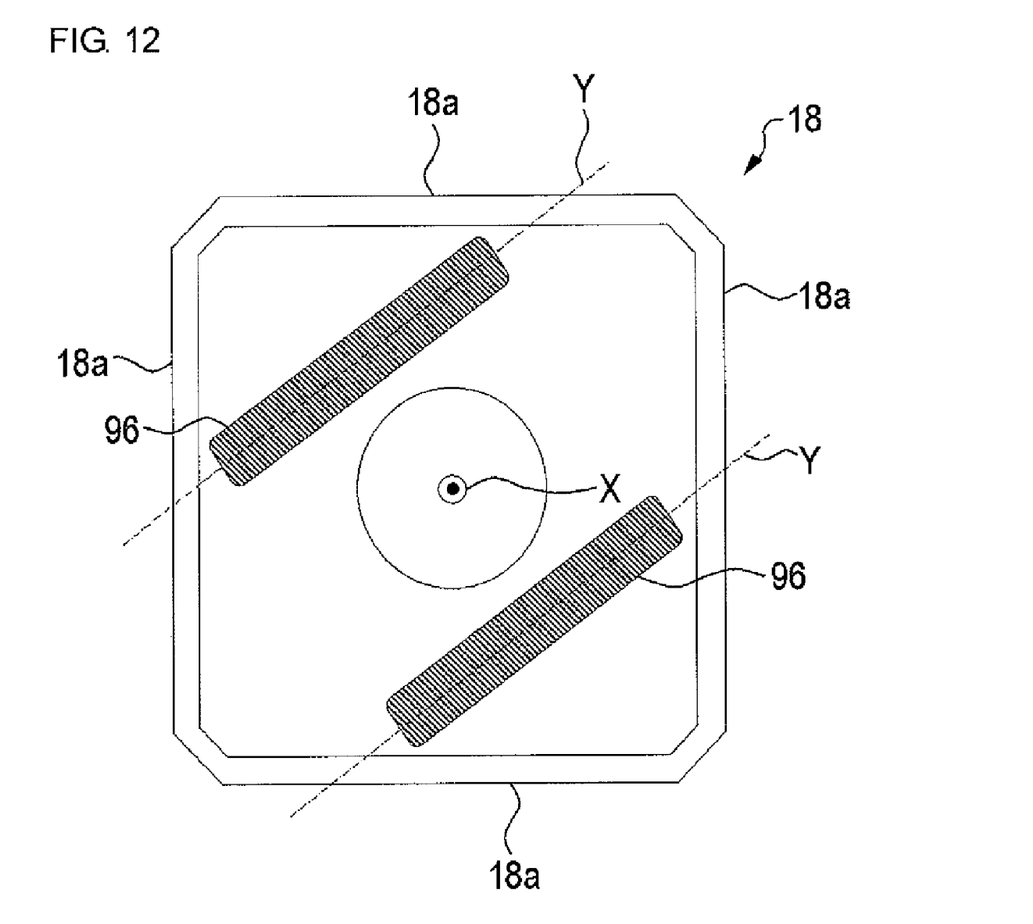
FIG. 12 is a schematic illustration showing a positional relationship between a brush holder and choke coils of a motor according to a second exemplary embodiment.

FIG. 12 is a schematic illustration showing a positional relationship between a brush holder and choke coils of a motor according to a second exemplary embodiment. A pair of choke coils 96 in the second exemplary embodiment, in their respective longer directions Y, is arranged such that it is not parallel with all the side walls 18a. Also, each of the choke coils 96, in the longer direction Y, is so arranged as to intersect with two adjacent side walls 18a with a corner section positioned therebetween. Also, the pair of choke coils 96 is arranged in such positions that they are parallel to each other with an axis line X of the housing and are symmetrical with respect to the axis line X as the center. Such an arrangement enables a plurality of larger choke coils to be mounted on one face of the brush holder 18 vertical to the axis line of the housing.

(Third Exemplary Embodiment)

Figure 13:
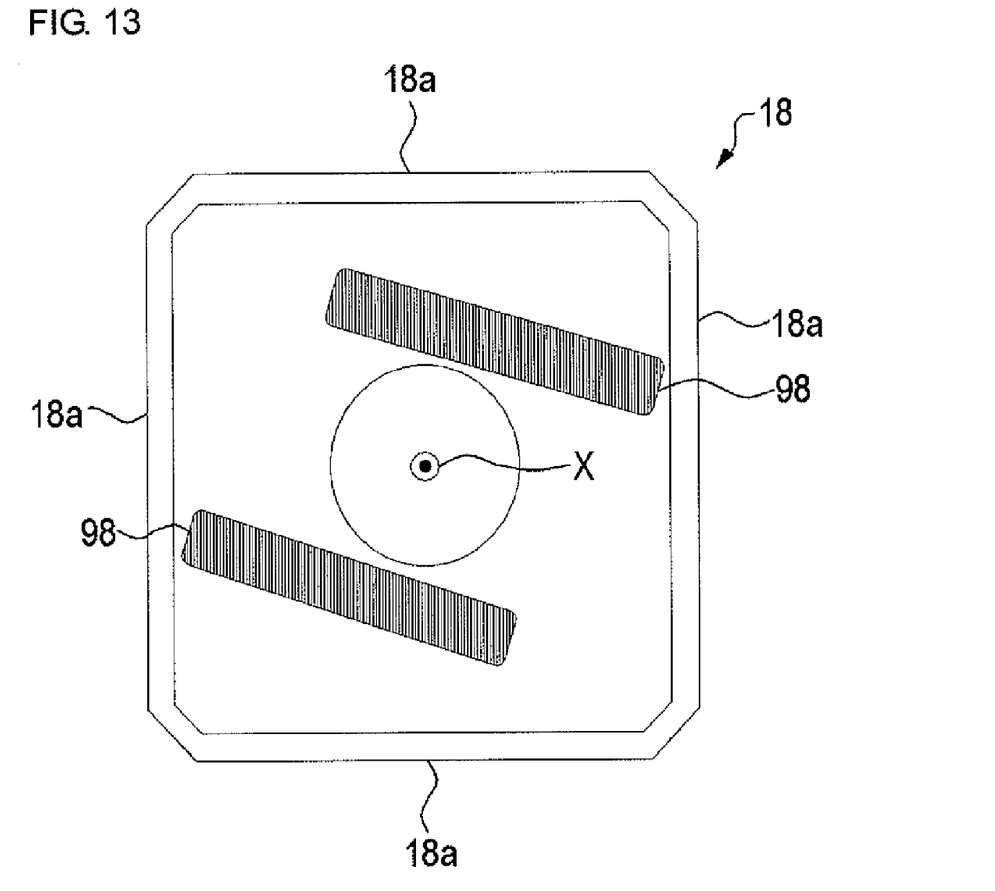
FIG. 13 is a schematic illustration showing a positional relationship between a brush holder and choke coils of a motor according to a third exemplary embodiment.

FIG. 13 is a schematic illustration showing a positional relationship between a brush holder and choke coils of a motor according to a third exemplary embodiment. Note that in the second exemplary embodiment the pair of choke coils 96 shown in FIG. 12 is arranged almost line-symmetrically with respect to the axis line X of the housing as the center. Differing from such an arrangement shown in FIG. 12, a pair of choke coils 98 shown, in FIG. 13, according to the third exemplary embodiment is arranged almost point-symmetrically with respect to the axis line X of the housing as the center. Also, the choke coil 96, in the longer direction, is disposed at an angle less than 45 degrees relative to one of two adjacent side walls 18a and is also disposed at an angle greater than 45 degrees relative to the other thereof. This arrangement enables the choke coils 96 of a larger size to be mounted on one face of the brush holder 18.

(Third Exemplary Embodiment)

Figure 14:
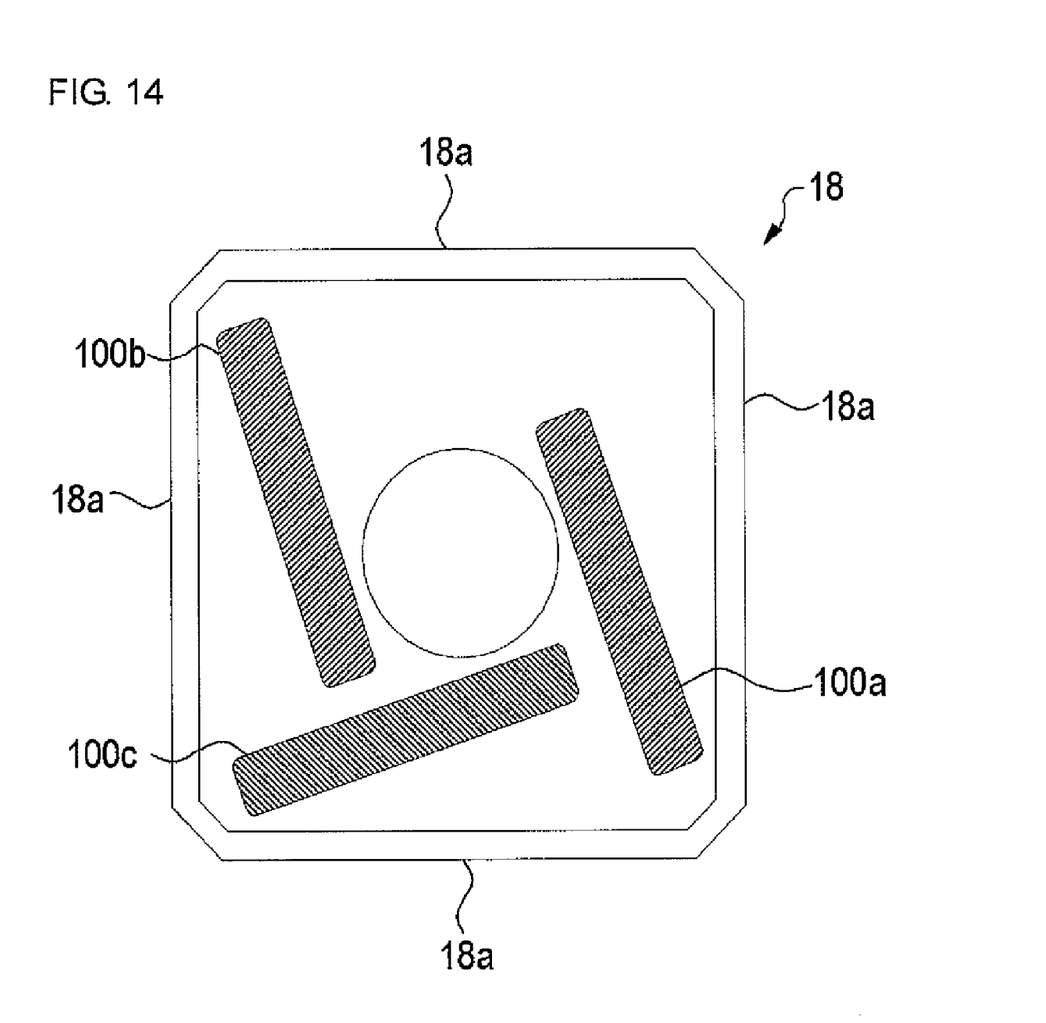
FIG. 14 is a schematic illustration showing a positional relationship between a brush holder and choke coils of a motor according to a fourth exemplary embodiment.

FIG. 14 is a schematic illustration showing a positional relationship between a brush holder and choke coils of a motor according to a fourth exemplary embodiment. In the brush holder 18 shown in FIG. 14, a choke coil 100c, in a longer direction, which is so arranged as to intersect with a choke coil 100a and a choke coil 100b is arranged in addition to a pair of choke coils 100a and 100b, disposed parallel to each other, as shown in FIG. 13. Accordingly, the choke coils 100a, 100b and 100c of approximately the same size can be arranged on one face of the brush holder 18. It is to be noted here that a similar arrangement enables four choke coils to be mounted on one face of the brush holder 18.

(Third Exemplary Embodiment)

Figure 15:
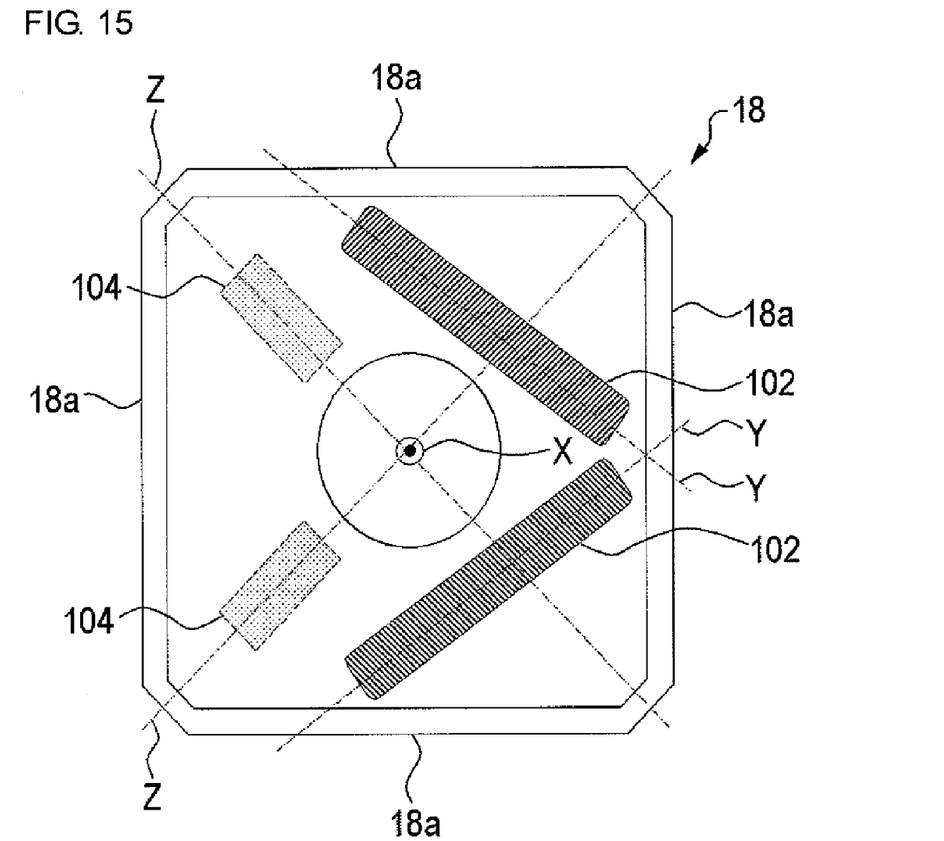
FIG. 15 is a schematic illustration showing a positional relationship between a brush holder and choke coils of a motor according to a fifth exemplary embodiment.
Figure 16:
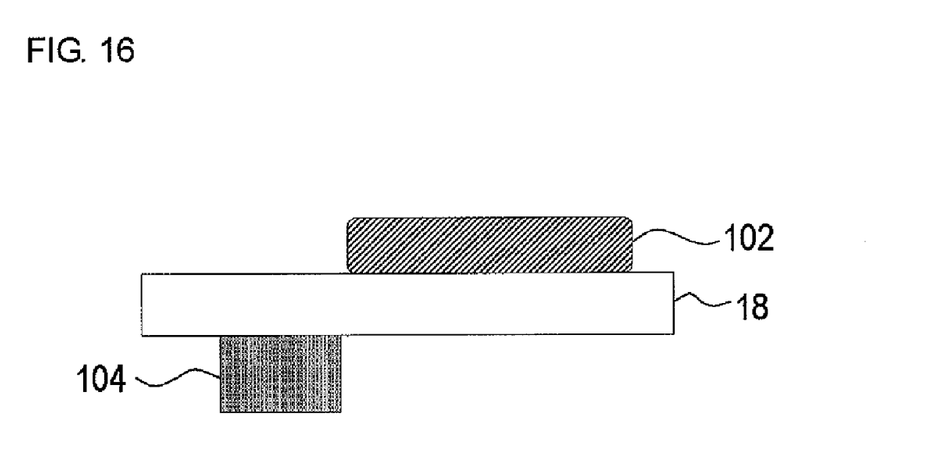
FIG. 16 is a side view of the brush holder shown in FIG. 15.

FIG. 15 is a schematic illustration showing a positional relationship between a brush holder and choke coils of a motor according to a fifth exemplary embodiment. FIG. 16 is a side view of the brush holder shown in FIG. 15. A pair of choke coils 102 according to the fifth exemplary embodiment, in their respective longer directions Y, is arranged such that it is not parallel with all the side walls 18a. Also, each of the choke coils 102, in the longer direction Y, is so arranged as to intersect with two adjacent side walls 18a with a corner section positioned therebetween. Also, the pair of choke coils 102 is arranged in such positions that the longer directions Y intersect with each other. The carbon brushes 104 are also arranged on a face of the brush holder 18 opposite to the face thereof where the choke coils 102 are arranged. A pair of the carbon brushes 104 is disposed on diagonals Z connecting the corner sections. This arrangement enables the choke coils and the carbon brushes to be arranged without any interference with each other.

(Sixth Exemplary Embodiment)

Figure 17:
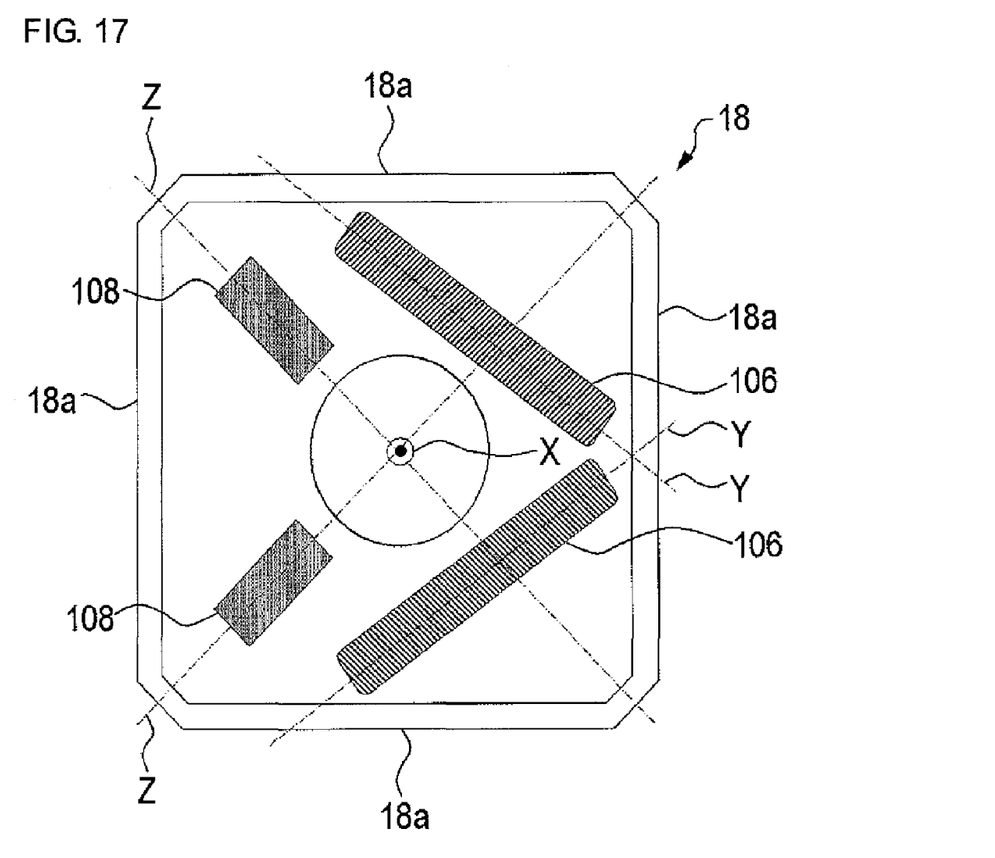
FIG. 17 is a schematic illustration showing a positional relationship between a brush holder and choke coils of a motor according to a sixth exemplary embodiment.
Figure 18:
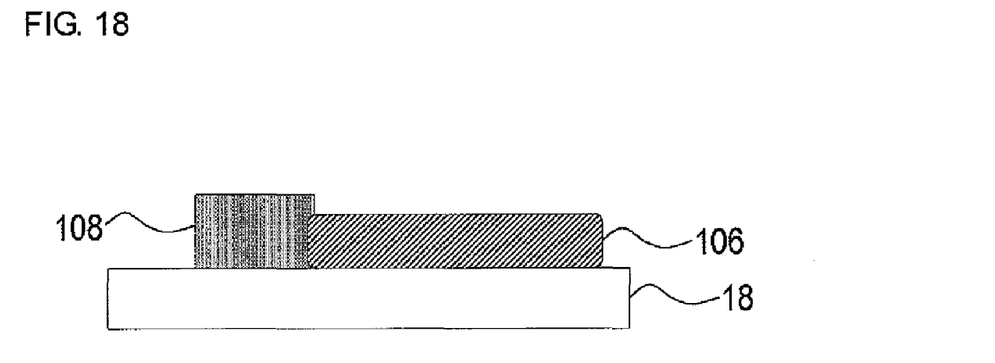
FIG. 18 is a side view of the brush holder shown in FIG. 17.

FIG. 17 is a schematic illustration showing a positional relationship between the brush holder, choke coils, and carbon brushes of a motor according to a sixth exemplary embodiment. FIG. 18 is a side view of the brush holder shown in FIG. 17. A pair of choke coils 106 according to the sixth exemplary embodiment, in their respective longer directions Y, is arranged such that it is not parallel with all the side walls 18a. Also, each of the choke coils 106, in the longer direction Y, is so arranged as to intersect with two adjacent side walls 18a with a corner section positioned therebetween. Also, the pair of choke coils 106 is arranged in such positions that the longer directions Y intersect with each other. The carbon brushes 108 are also arranged on one of the faces of the brush holder 18 where the choke coils 106 are arranged. A pair of the carbon brushes 108 is disposed on the diagonals Z connecting the corner sections. This arrangement enables the choke coils and the carbon brushes to be arranged on the same face of the brush holder 18 without any interference with each other. This further enables the axial length of the motor to be made shorter.

The present invention is not limited to the above-described embodiment and exemplary embodiments only, and it is understood by those skilled in the art that various modifications such as changes in design may be added to the embodiment and the exemplary embodiments based on their knowledge and the embodiment and the exemplary embodiments added with such modifications are also within the scope of the present invention.

In the above-described embodiment, an exemplified structure is such that choke coils 76 are arranged on one face of the brush holder 18 and carbon brushes 30 on the other face thereof. However, a motor according to a modification may be so configured that the choke coils 76 and the carbon brushes 30 are arranged together on one face of the brush holder 18. More specifically, a pair of choke coils 76 may be so arranged around the shaft that the axial directions of the respective choke coils intersect with each other (in a gable fashion) as described previously, and the carbon brushes 30 may be so arranged that the stroke directions are in parallel with the axial directions of the choke coils 76. In other words, the pair of choke coils 76 arranged such that they are not parallel with each other are closer to each other at one end and wider apart from each other at the other end thereof. Thus it is possible to place the carbon brushes 30 in the regions between the other ends of the respective choke coils 76. In this manner, a pair of choke coils 76 and carbon brushes 30 can be arranged together on one face of the brush holder 18 by utilizing the space efficiently. As a result, the choke coils 76 can be accommodated without the extension of the axial length of the motor 10.

In the above-described embodiment, an exemplified housing 12 (metal case 16 and brush holder 18) of the motor 10 is quadrangular in shape having four flat surfaces and rounded corner sections. In a modification thereof, the housing may be of octagonal or other polygonal shape, for instance. The corner sections may be chamfered round or flat or may be without any chamfer.

In the above-described embodiment, an exemplified carbon brush 30 is a prismatic column with a rectangular cross section. However, the carbon brush 30 may be a cylindrical or other long column in shape. In such a case, the shape of the carbon holder which holds the carbon brush may be determined accordingly.

In the above-described embodiment, an exemplified 4-pole magnet 20 is integrally molded. In a modification thereof, however, four magnets each having a thick-walled portion and thin-walled portions may be prepared separately in advance, and they may be fixed to the four corner sections of the metal case 16, respectively. That is, the magnets constituting the respective magnetic poles, which are separated from each other at the boundary (thin-walled part) between the neighboring magnetic poles of the magnet 20, may be formed separately.

In the above-described embodiment, an exemplified structure is such that the circuit board 27 with an element for circuit protection mounted thereon is disposed between the brush holder 18 and the securing holder 19. In a modification thereof, however, the motor may be of a simplified structure without the installation of such a printed-circuit board with circuits mounted thereon, depending on the application of the motor.

What is claimed is:
1. A motor comprising:
 a housing having four flat rectangular side walls and joining sections each joining the adjacent side walls;
 a magnet disposed along inner peripheral surfaces of the housing, the magnet having magnetic poles in the joining sections;
 a shaft inserted along an axis of the housing;

an armature fixed to the shaft in such a position as to be opposite to the magnet;

a commutator mounted on the shaft;

a brush in sliding contact with an outer peripheral surface of the commutator; and an electrical component provided within the housing, wherein the electrical component is arranged such that a straight line including the longitudinal axis of the electrical component is not parallel with any of the side walls of the housing, and wherein the electrical component is arranged such that a straight line including the longitudinal axis of the electrical component intersects with two adjacent side walls.

2. A motor according to claim 1, wherein the electrical component includes first and second electrical components arranged in a plane perpendicular to the axis of the housing, and wherein the first and second electrical components are arranged around the shaft such that straight lines including the longitudinal axes of the first and second electrical components intersect with each other.

3. A motor according to claim 2, wherein the brush is a carbon brush, and the carbon brush is placed on a diagonal connecting the joining sections.

4. A motor according to claim 2, wherein the electrical component is a choke coil.

5. A motor according to claim 1, wherein the brush is a carbon brush, and the carbon brush is placed on a diagonal connecting the joining sections.

6. A motor according to claim 5, wherein the electrical component is a choke coil.

7. A motor according to claim 2, wherein the electrical component is a choke coil.

* * * * *